US007976941B2

(12) United States Patent
Lodyga et al.

(10) Patent No.: US 7,976,941 B2
(45) Date of Patent: Jul. 12, 2011

(54) BORON NITRIDE PARTICLES OF SPHERICAL GEOMETRY AND PROCESS FOR MAKING THEREOF

(75) Inventors: David Lodyga, Medina, OH (US); Joseph W. Tereshko, Broadview Heights, OH (US); Ajit Sane, Medina, OH (US); Thomas Fox, Euclid, OH (US); Paulo Meneghetti, Avon, OH (US)

(73) Assignee: Momentive Performance Materials Inc., Albany, NY (US)

( * ) Notice: Subject to any disclaimer, the term of this patent is extended or adjusted under 35 U.S.C. 154(b) by 0 days.

(21) Appl. No.: 11/327,770

(22) Filed: Jan. 6, 2006

(65) Prior Publication Data
US 2006/0127422 A1 Jun. 15, 2006

Related U.S. Application Data

(63) Continuation-in-part of application No. 10/652,283, filed on Aug. 29, 2003, which is a continuation-in-part of application No. 09/754,154, filed on Jan. 3, 2001, now Pat. No. 6,713,088, which is a continuation-in-part of application No. 09/386,883, filed on Aug. 31, 1999, now abandoned, application No. 11/327,770, which is a continuation-in-part of application No. 11/248,095, filed on Oct. 12, 2005, now Pat. No. 7,445,797, which is a continuation-in-part of application No. 11/207,865, filed on Aug. 19, 2005.

(60) Provisional application No. 60/661,395, filed on Mar. 14, 2005.

(51) Int. Cl.
*B32B 18/00* (2006.01)
*B32B 5/16* (2006.01)

(52) U.S. Cl. ........ 428/325; 424/489; 424/490; 424/496; 424/497; 424/500; 424/657; 428/323; 428/402; 264/13; 423/278; 423/290; 516/33; 516/78; 524/404

(58) Field of Classification Search .................. 424/489, 424/657, 490, 496, 497, 500; 514/64; 428/323, 428/325, 402; 264/13; 423/278, 290; 501/96.4; 516/33, 78; 524/404
See application file for complete search history.

(56) References Cited

U.S. PATENT DOCUMENTS

| 3,499,859 A | 3/1970 | Matherly |
| 3,617,358 A | 11/1971 | Dittrich |
| 4,202,523 A | 5/1980 | Radtke |
| 4,460,739 A | 7/1984 | Ashby |
| 4,623,738 A | 11/1986 | Sugerman et al. |
| 4,634,785 A | 1/1987 | Sugerman et al. |
| 4,985,184 A | 1/1991 | Takahashi et al. |
| 5,001,091 A | 3/1991 | Pujari et al. |
| 5,008,307 A | 4/1991 | Inomata |
| 5,049,450 A * | 9/1991 | Dorfman et al. ............. 428/570 |
| 5,106,502 A | 4/1992 | Goldsmith |
| 5,139,693 A | 8/1992 | Wilms et al. |
| 5,182,239 A * | 1/1993 | Hirokawa et al. ............ 501/98.4 |
| 5,196,471 A * | 3/1993 | Rangaswamy et al. ....... 428/407 |
| 5,380,782 A | 1/1995 | Bogan, Jr. |
| 5,384,352 A | 1/1995 | Andres et al. |
| 5,421,864 A | 6/1995 | Chiba et al. |
| 5,427,698 A | 6/1995 | Hirokawa et al. |
| 5,457,075 A * | 10/1995 | Fukushima et al. ......... 501/96.4 |
| 5,506,055 A * | 4/1996 | Dorfman et al. ............. 428/407 |
| 5,665,511 A | 9/1997 | Imai et al. |
| 5,681,883 A | 10/1997 | Hill et al. |
| 5,818,564 A | 10/1998 | Gray et al. |
| 5,859,105 A | 1/1999 | Nguyen |
| 5,898,009 A * | 4/1999 | Shaffer et al. ............... 501/96.4 |
| 6,022,395 A | 2/2000 | Eckert et al. |
| 6,048,511 A | 4/2000 | Shaffer et al. |
| 6,048,919 A | 4/2000 | McCullough |
| 6,090,484 A | 7/2000 | Bergerson |
| 6,160,042 A | 12/2000 | Ishida |
| 6,162,849 A | 12/2000 | Zhuo et al. |
| 6,246,459 B1 | 6/2001 | Simhambhatla et al. |
| 6,280,584 B1 | 8/2001 | Kumar et al. |
| 6,391,442 B1 | 5/2002 | Duvall et al. |
| 6,508,980 B1 * | 1/2003 | Sachs et al. ..................... 419/45 |
| 6,542,371 B1 | 4/2003 | Webb |
| 6,645,612 B2 * | 11/2003 | Pujari et al. .................. 428/325 |
| 6,652,822 B2 | 11/2003 | Phillips et al. |
| 6,677,068 B2 * | 1/2004 | Itoh et al. ........................ 429/30 |
| 6,713,088 B2 * | 3/2004 | Lodyga et al. ................. 424/489 |
| 6,761,928 B2 | 7/2004 | Hill et al. |
| 6,797,758 B2 | 9/2004 | Misra et al. |
| 6,831,031 B2 | 12/2004 | Ishihara |
| 6,835,453 B2 | 12/2004 | Greenwood et al. |

(Continued)

FOREIGN PATENT DOCUMENTS

| EP | 0198374 A | 10/1986 |
| EP | 0 322 165 | 6/1989 |
| EP | 424094 A | 4/1991 |
| EP | 0 696 630 | 2/1996 |
| EP | 1 143 511 | 10/2001 |
| EP | 1 197 972 | 4/2002 |
| EP | 1 414 063 | 4/2004 |
| JP | 05-051557 | 3/1993 |
| JP | 50-051540 | 3/1993 |
| JP | 1993051540 | 3/1993 |

(Continued)

OTHER PUBLICATIONS

MacMillan, "Encyclopedia of Physics", J.S. Rigden, Ed., Simon & Schuster MacMillan: New York, 1986, vol. 4, p. 1677.*

(Continued)

*Primary Examiner* — James H Alstrum Acevedo
(74) *Attorney, Agent, or Firm* — Joseph E. Waters

(57) ABSTRACT

A low viscosity filler boron nitride agglomerate particles having a generally spherical shape bound together by an organic binder and to a process for producing a BN powder composition of spherically shaped boron nitride agglomerated particles having a treated surface layer which controls its viscosity.

31 Claims, 4 Drawing Sheets

U.S. PATENT DOCUMENTS

| | | | |
|---|---|---|---|
| 6,913,827 | B2 | 7/2005 | George et al. |
| 2002/0127406 | A1 | 9/2002 | Sachdev et al. |
| 2003/0073769 | A1 | 4/2003 | Pujari et al. |
| 2003/0152764 | A1 | 8/2003 | Bunyan et al. |
| 2003/0195124 | A1 | 10/2003 | Yamada et al. |
| 2003/0203188 | A1 | 10/2003 | Bunyan |
| 2003/0207064 | A1 | 11/2003 | Bunyan et al. |
| 2003/0222249 | A1 | 12/2003 | Bunyan |
| 2004/0000712 | A1 | 1/2004 | Wilson et al. |
| 2004/0007764 | A1 | 1/2004 | Jang |
| 2004/0009353 | A1 | 1/2004 | Knowles et al. |
| 2004/0077764 | A1* | 4/2004 | Lodyga et al. ............... 524/445 |
| 2004/0118551 | A1 | 6/2004 | Czubarow et al. |
| 2004/0220419 | A1 | 11/2004 | Gottschalk-Gaudig et al. |
| 2005/0041373 | A1 | 2/2005 | Pruss et al. |
| 2005/0153124 | A1 | 7/2005 | Finn et al. |
| 2006/0121068 | A1* | 6/2006 | Sane et al. ............... 424/400 |
| 2006/0127422 | A1 | 6/2006 | Lodyga et al. |
| 2007/0041918 | A1 | 2/2007 | Meneghetti et al. |
| 2007/0054122 | A1 | 3/2007 | Paisner et al. |

FOREIGN PATENT DOCUMENTS

| | | |
|---|---|---|
| JP | 06-219714 | 8/1994 |
| JP | 07-215705 | 8/1995 |
| JP | 59-133360 | 8/1995 |
| JP | 08-052713 | 2/1996 |
| JP | 08-127793 | 5/1996 |
| JP | 9012771 | 1/1997 |
| WO | WO 03027207 | 4/2003 |

OTHER PUBLICATIONS

"Sintering of the Mechanochemically Activated Powders of Hexagonal Boron Nitride," by Hagio et al., Communications of the American Ceramics Society, vol. 72, No. 8, pp. 1482-1484.

Office Action for U.S. Appl. No. 10/652,283, dated Jun. 17, 2010.
Office Action for U.S. Appl. No. 10/652,283, dated Sep. 30, 2009.
Office Action for U.S. Appl. No. 10/652,283, dated May 13, 2008.
Office Action for U.S. Appl. No. 10/652,283, dated Jul. 3, 2007.
Office Action for U.S. Appl. No. 10/652,283, dated Apr. 19, 2006.
Office Action for U.S. Appl. No. 11/248,095, dated Jan. 19, 2007.
Office Action for U.S. Appl. No. 11/248,095, dated Aug. 3, 2007.
Office Action for U.S. Appl. No. 11/248,095, dated Feb. 20, 2008.
Office Action for U.S. Appl. No. 11/248,095, dated Jul. 11, 2008.
Office Action for U.S. Appl. No. 11/554,005, dated Jun. 27, 2008.
Pay Yih and Deborah D.L. Chung, Power Metallurgy Fabrication of Metal Matrix Composites Using Coated Fillers, pp. 335-340, The International Journal of Powder Metallurgy 1995.
Salvatore J. Monte, Neoalkoxy Titanate and Zirconate Coupling Agent Additives in Thermoplastics, Polymers & Polymer Composites, vol. 10, No. 2, 2002.
Office Action for U.S. Appl. No. 09/386,883, dated Jul. 3, 2000.
Office Action for U.S. Appl. No. 09/754,154, dated Mar. 22, 2002.
Office Action for U.S. Appl. No. 11/207,865, dated Oct. 2, 2007.
Office Action for U.S. Appl. No. 11/207,865, dated Jul. 10, 2008.
Office Action for U.S. Appl. No. 11/207,865, dated Mar. 10, 2009.
Office Action for U.S. Appl. No. 11/207,865, dated Oct. 9, 2009.
Sodium Silicate Based Thermal Interface Material for High Thermal Contact Conductance, Transactions of ASME, vol. 122, Jun. 2000, pp. 128-131.
Office Action for U.S. Appl. No. 10/652,283, dated Feb. 22, 2011.
Alfonso R. Gennaro, Remington's Pharmaceutical Sciences, 1985, pp. 1317-1318, 17th Edition, Mack Publishing Company, Easton, Pennsylvania.

* cited by examiner

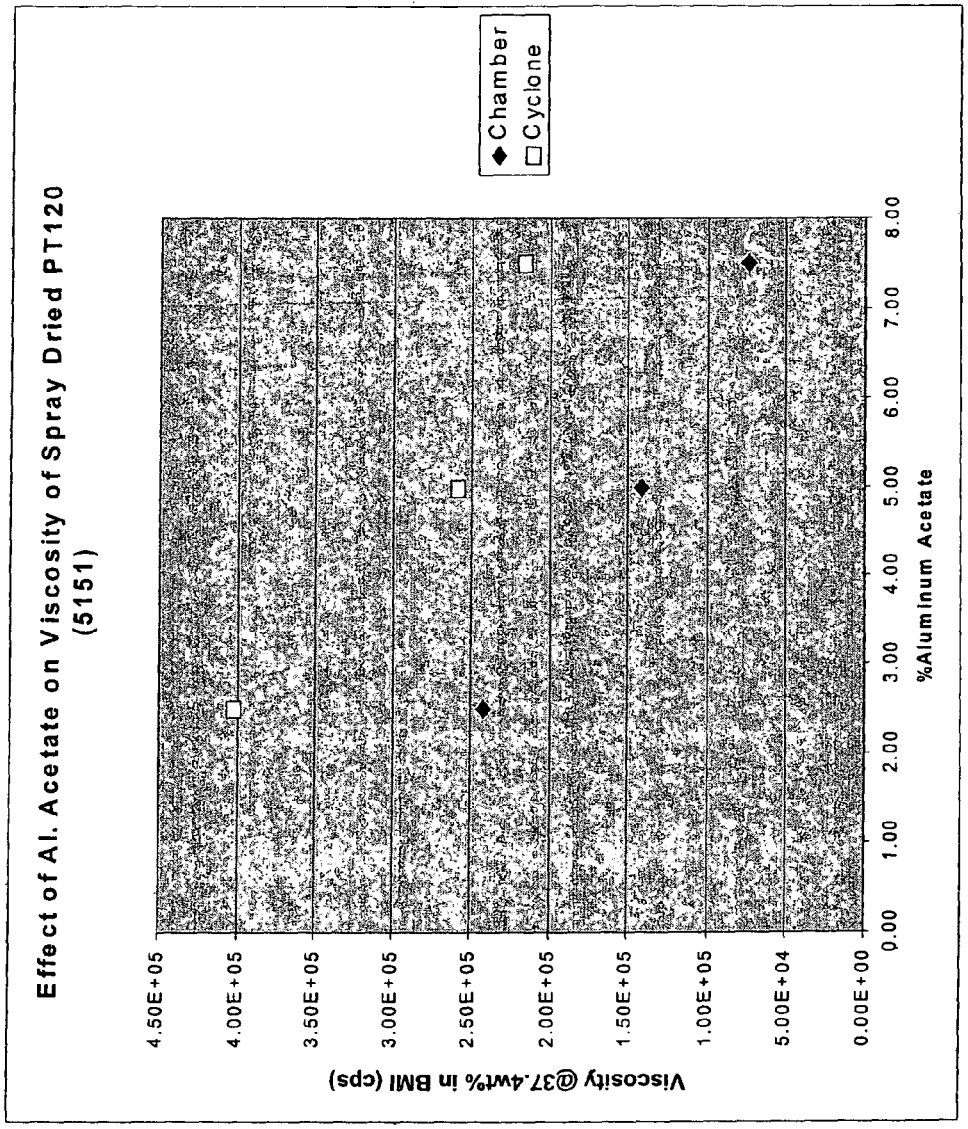
FIG. 4  PolarSphere: Effect on Viscosity

BORON NITRIDE PARTICLES OF SPHERICAL GEOMETRY AND PROCESS FOR MAKING THEREOF

CROSS-REFERENCE TO RELATED APPLICATIONS

This application is a CIP of and claims priority to U.S. patent application Ser. No. 10/652,283 filed Aug. 29, 2003, which application is a CIP of U.S. patent application Ser. No. 09/754154, filed Jan. 3, 2001, now U.S. Pat. No. 6,713,088, issued Apr. 22, 2004, which is a CIP of U.S. patent application Ser. No. 09/386,883 filed Aug. 31, 1999 now abandoned. This application is also a CIP of and claims priority to U.S. patent application Ser. No. 11/248095 with a filing date of Oct. 12, 2005 now U.S. Pat. No. 7,445,797, which application is a CIP of U.S. patent application Ser. No. 11/207865, filed Aug. 19, 2005, which application claims the priority benefit of U.S. patent application Ser. No. 60/661395 filed Mar. 14, 2005.

FIELD OF THE INVENTION

This invention relates to boron nitride agglomerated particles of spherical geometry, a process for forming boron nitride agglomerated particles of spherical geometry, and low viscosity boron nitride filled composition composed of boron nitride agglomerated particles of spherical geometry. In one embodiment, the composition comprises at least a polymer selected from the group of a polyester, epoxy, polyamide, or silicone, and loaded with BN particles in a concentration of 30-50 wt. % BN.

BACKGROUND OF THE INVENTION

Boron nitride (BN) is a chemically inert non-oxide ceramic material which has a multiplicity of uses based upon its electrical insulating property, corrosion resistance, high thermal conductivity and lubricity. A preferred use is as a filler material additive to a polymeric compound, for forming a low viscosity encapsulating material, or as a low viscosity thermosetting adhesive for use in semiconductor manufacture or in formulating a cosmetic material. As presently manufactured, boron nitride is formed by a high temperature reaction of between inorganic raw materials into a white powder composition of BN particles having an hexagonal structure similar to graphite in a platelet morphology. The platelet morphology is for many applications undesirable and of limited utility. A conventional powder composition of BN particles has the physical attributes of flour in terms of its inability to flow. Accordingly, when added as a filler to a polymeric compound, the viscosity of the blended material increases significantly in proportion to the loading concentration of the BN additive. In some cases, at concentrations above 30% BN, the blended material can no longer be adequately dispensed from a mechanical dispenser such as a syringe.

JP Patent Publication No. 08-052713 discloses spherical bodies having a size of 10 mm or less for use as ball mills, formed from slurry comprising ceramic powder such as BN, polymerizable monomers such as polyvinyl, alumina powder, yttria powder, and a dispersant. JP Patent Publication No. 08-127793 provides a BN slurry having a low viscosity and improved adhesion formed by dispersing BN in an aqueous solution of a water-soluble nonionic cellulose ether and a polycarboxylic acid salt as a dispersant. JP Publication No. 06-219714 discloses a slurry formed by dispersing BN in a polyoxythylene-based nonionic surfactant.

U.S. Pat. No. 6,652,822 discloses spherical BN formed from precursor particles of BN suspended in an aerosol gas, which is directed to a microwave plasma torch. U.S. Pat. No. 3,617,358 discloses spheroid particles formed by flame spraying a slip or slurry of fine particles such as metal powder, ceramic powder, and the like, in a slurry comprising a binder for binding the flame spray particles, using a thermal spray gun and with acetylene as the combustible and carrier gas. The spheroid particles formed by the flame spraying technique of the prior art have a crush resistance of at least 0.7 grams. In the flame spraying process as used in the prior art, flame temperatures may range from over 3000° C. to 5000° C., which would cause ceramic materials such as BN to lose their properties as heated above the melting points.

Unfired BN tends to have poor thermal conductivity in thermally conductive applications. Thus, it is known in the art to sinter BN powder to high temperatures of at least 1900-2000° C. to enhance the properties of the final BN product, i.e., improving the purity of the BN and leading to crystal or platelet growth. In thermally loaded polymer applications, the thermal conductivity improves with BN platelet sizes.

In the present invention, the surface morphology and shape of conventional platelet BN particles are modified to form boron nitride agglomerated particles, bound by an organic binder having a rheology when spray dried. In one embodiment, such boron nitride agglomerated particles when filled into a polymeric compound at loading levels between 30 to 50 wt. % BN, the viscosity of the filled composition remains below 300 cp and preferably below a viscosity of 250 cp. In a second embodiment, the boron nitride agglomerated particles when sintered, form aluminum oxide coating that further enhances the thermal conductivity of the BN in thermally conductive applications.

BRIEF SUMMARY OF THE INVENTION

In accordance with the present invention, a low viscosity composition of spherically shaped agglomerated particles of boron nitride can be formed by spray drying an aqueous slurry composed of boron nitride particles of random irregular shape in combination with an organic binder and a base adapted to maintain the pH of the slurry above about 7.3 and optimally above a pH of 7.5, at a sustained elevated temperature into a dry powder composition of spherically shaped BN agglomerated particles with the concentration of the organic binder in the slurry adjusted to at least above about 1.8 wt. % of the slurry to form a decomposition layer from said organic binder on said particles, which modifies the surface viscosity of the composition without degrading the physical properties attributable to boron nitrate such as high thermal conductivity.

Each BN particle in the composition of the present invention represents a composite agglomerate of non-spherical BN particles bound together by an organic binder in a generally spherical geometry. The diameter of each spherically shaped BN particle formed by the spray drying method of the present invention may vary in size over a relatively wide size distribution of sizes, but may be controlled so that the majority of particles and up to about 98% of the BN particles have a minimum diameter above one micron, and preferably a minimum diameter above about 5 microns. The size distribution of the BN particles may extend to a maximum diameter of about 275 microns. Although the size distribution is relatively wide, the BN particles have an average size which falls into a much narrower size range between about 10 microns and 150 microns in diameter, and can be adjusted to form an even narrower size range by adjustment of the physical parameters of the spray drying operation and/or the initial size of the non-spherical particles of BN in the slurry. Accordingly, the size of the spherical BN agglomerated particles formed in the spray drying process of the present invention can be controllably varied over of a preferred range of from as low as 1 micron in diameter, to a preferred maximum diameter of about 75 microns so as to accommodate a variety of end uses.

The spherical shape of the BN particles formed in accordance with the present invention and the weight concentration of organic binder in the slurry controls the degree to which the particles flow and, in turn, the viscosity of the polymeric compound into which the particles are loaded. The ability to "flow" is an essential characteristic of the spray dried BN material when used as a low viscosity filler. The degree to which a material can "flow" is readily measurable as is well known to those skilled in the art. In contrast, a powder composition of conventional non-spherical BN is unable to flow and inhibits the flow characteristic of the filled polymer. In one embodiment, the standard used to establish the existence or non-existence of a flowable material is the ASTM B213-77 flow standard as is well known to those skilled in the art. In one embodiment of the present invention, it is essential to be able to load the BN spray dried particles into a polymeric compound at loading levels of above at least 30 wt. % BN. In another embodiment, between about 35 to 50 wt. % BN without increasing the viscosity of the blend above about 250 cp.

In one embodiment, the BN particles can be loaded into any polymer from the group consisting of a polyester, a polyimide or an epoxy.

A low viscosity BN filled composition is formed in accordance with the method of the present invention comprising the steps of: forming an aqueous slurry composed of irregular non-spherically shaped BN particles, water, an organic binder and a base for maintaining the pH of the slurry at a pH above 7.3, adjusting the concentration of organic binder to a minimum level above about 1.8 wt. % of the slurry, and preferably above about 2 wt. %; spray drying the aqueous slurry into a powder consisting of agglomerated BN particles of generally spherical shape and adding the powder as a filler into a polymeric compound at a loading level of between 30 to 50 wt. % BN.

BRIEF DESCRIPTION OF THE DRAWING

Other objects and advantages of the present invention will become apparent from the following description of the preferred embodiment when read in conjunction with the accompanying drawings:

FIG. 4 is a graph showing the relationship of viscosity at a given loading of spray dried BN filler particles in an organic binder relative to the weight percent of binder in the slurry forming the spray dried BN particles.

DETAILED DESCRIPTION OF THE INVENTION

Figure 1:
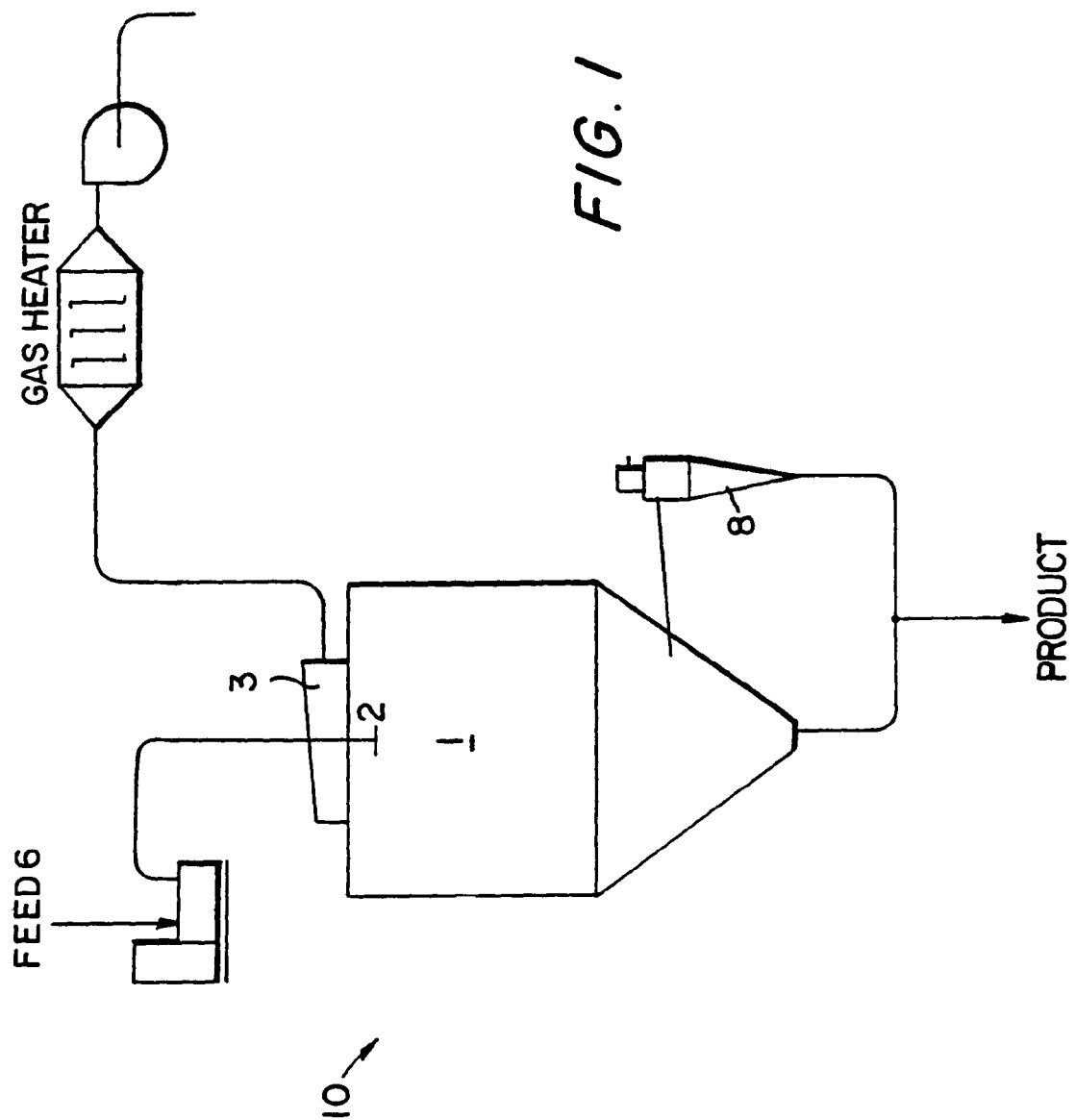
FIG. 1 is a block diagram of a conventional spray drying apparatus for producing the agglomerated spherically shaped BN particles in accordance with the present invention.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

As used herein, the term "functionalized" may be used interchangeably with "surface functionalized," "functionalized surface," "coated," "surface treated," or "treated," referring to the coating of the boron nitride component in agglomerate form or platelet form with the coupling agent of the invention.

As used herein, the term "functionalization" or "functionalized" relates to the chemical modification of the surface of the BN particles bound by the binder. A "functionalized surface" as used herein refers to the coating that has been modified chemically.

As used herein, the phrase "effective amount" or "sufficient amount" means that amount sufficient to bring about the desired effect, e.g., lowering the viscosity of a polymeric composition at least 20% over the viscosity of a polymeric composition not having this effective amount.

As used herein, an agglomerate is a collection of boron nitride platelets bonded together. A non-agglomerated boron nitride platelet comprises one or more crystallites.

In the present invention, spherically shaped agglomerates of irregular non-spherical BN particles are bound together by a binder and subsequently spray-dried. The process involves mixing from about 0.5 wt. % to about 10 wt. % of a binder with about 20 wt. % to about 70 wt. % hexagonal boron nitride powder in a medium under conditions effective to produce a hexagonal boron nitride slurry. The slurry is spray-dried forming boron nitride agglomerated particles of spherical geometry. In one embodiment, the spray-dried material is sintered for improved mechanical and physical properties.

Non-spherical BN Starting Material: In one embodiment, the starting material comprises irregular non-spherical hexagonal boron nitride (hBN). In a second embodiment, the starting material comprises irregular non-spherical BN having a turbostratic structure. In one embodiment, the starting material comprises hBN particles having an average particle-platelet size of from about 2 µm to about 20 µm. In a second embodiment, between about 2 µm and 12 µm, and in a third embodiment, between about 4 µm and about 10 µm. In one embodiment, the initial size of the non-spherical particles of the starting material is controlled to vary/obtained a desired particle size distribution for the final spherical agglomerates product formed.

In one embodiment, the starting material has an oxygen content of from about 0 wt. % to about 1.0 wt. %. In a second embodiment, from about 0 wt. % to about 0.5 wt. %. The use of hBN starting material with a low oxygen content produces boron nitride powders with a higher tap density. Higher tap density powders have many advantages as fillers in thermal management applications including: higher thermal conductivity, higher powder loading in a polymer; stronger agglomerates of hBN platelets (leading to improved metal adhesion in polymer BN composites); and lower porosity within the agglomerates (which results in less infiltration of polymer resin or liquid into the agglomerate).

In one embodiment, the hBN starting material has a surface area of from about 5 $m^2/g$ to about 30 $m^2/g$. In a second embodiment, about 7 $m^2/g$ to about 20 $m^2/g$.

The amount of starting BN material in the slurry ranges from about 20 to 70 wt. % of the slurry. In one embodiment, the slurry includes about 30 to 60 wt. % BN. In a third embodiment, from 30 to 50 wt. % BN.

Binder Material for the Slurry: The binder for use in the present invention is any binder which bonds the BN particles during spray drying and/or modifies its viscosity characteristic. In one embodiment, the binder comprises at least a material which reacts/decomposes in the process of the invention, forming a residue or coating on the spherical BN agglomerates, for the agglomerates to have a functionalized surface. Examples include aluminum acetate; nickel acetate; polyacrylates (acrylics), polyvinyls (such as polyvinyl butyral, polyvinyl alcohol, and polyvinyl butyral which typically decompose or further react forming residues at the temperature of the spray drying process.

In one embodiment, the binder material is selected from the group of metal acetates, metal nitrates, metal sulfates, and mixtures thereof. In some embodiments, these binder materials decompose upon heat-treatment forming oxides. Examples include calcium acetate, calcium sulfate, or calcium nitrate, sodium acetate, sodium sulfate, sodium nitrate, magnesium acetate, magnesium sulfate, magnesium nitrate, nickel acetate, nickel sulfate, nickel nitrate, copper acetate, copper sulfate, copper nitrate, zinc acetate, zinc sulfate, zinc nitrate, strontium acetate, strontium sulfate, strontium nitrate, yttrium acetate, yttrium sulfate, yttrium nitrate, zirconium acetate, zirconium sulfate, zirconium nitrate, hafnium sulphate, hafnium nitrate, titanium sulfate, molybdenum acetate, molybdenum sulfate, vanadium acetate, vanadium sulfate, vanadium nitrate, chromium acetate, chromium sulfate, chromium nitrate, manganese acetate, manganese sulfate, manganese nitrate, ferrous acetate, ferrous sulfate, ferrous nitrate, cobalt acetate, cobalt sulfate, cobalt nitrate, cadmium acetate, cadmium sulfate, cadmium nitrate, silver acetate, silver sulfate, silver nitrate, palladium acetate, palladium sulfate, palladium nitrate, rhodium acetate, rhodium sulfate, rhodium nitrate, colloidal silica and the like, upon heat treatment, decomposes into the corresponding metal oxide forming a coating layer on the spherical BN agglomerates.

In one embodiment, the binder material is selected from at least one of aluminum sulfate, aluminum propoxide, aluminum silicate, sodium aluminate, aluminum acetate, and the like, which decompose in the sintering step downstream of the process to form alpha aluminum oxide, coating the spherical boron nitride agglomerates for composites of boron nitride/aluminum oxide.

In yet another embodiment, the binder is selected from the group of calcium acetate, calcium sulfate, and calcium nitrate, for decomposition forming a coating of calcium oxide on the spherical BN agglomerates. In one embodiment, a binder of sodium acetate, sodium sulfate, or sodium nitrate is used, for a coating of sodium oxide on the BN agglomerates. In a third embodiment, a binder of magnesium acetate, magnesium sulfate, or magnesium nitrate gives magnesium oxide as a coating material. In a fourth embodiment, a coating material of nickel acetate, nickel sulfate, or nickel nitrate is used for a nickel oxide coating. In a fifth embodiment, a copper acetate, copper sulfate, or copper nitrate is used as the binder material, for the formation of a copper oxide coating. In a sixth embodiment, a zinc acetate, zinc sulfate, or zinc nitrate is used as the binder material, for zinc oxide to be formed as a coating material on the BN agglomerates. In a seventh embodiment, the binder is selected from the group of strontium acetate, strontium sulfate, strontium nitrate, for strontium oxide to be formed as a coating layer.

In one embodiment, the binder is an organic binder, e.g., a water-soluble acrylic or acetate which at high concentration has been found to function as a viscosity modifier. In one embodiment, with a requirement to modify the BN particles viscosity characteristic limits the choice of organic binder to a water-soluble acrylic or acetate, which at high concentration has been found to function as a viscosity modifier.

Examples of acrylic binder formed from monoethylenically unsaturated acid free monomers include $C_1$-$C_4$ alkyl esters of acrylic or methacrylic acids such as methly acrylate, ethyl acrylate, butyl acrylate, methyl methacrylate, ethyl methacrylate, butyl methacrylate and isobutyl methacrylate; hydroxylalkyl esters of acrylic methacrylic acids such as hydroxyethyl acrylate, hydroxypropyl acrylate, hydroxyethyl methacrylate and hydroxypropyl methacrylate; acrylamides and alkyl-substituted acrylamides including acrylamide, methacrylamide, N-tertiaybutylacrylamide, N-methacrylamide and N,N-dimethacrylamide, dimethylaminoethyl acrylate, dimethylaminoethyl methacrylate; acrylonitrile and methacrylonitrile. The monoethylenically unsaturated acid free monomer may include the acrylic monomer styrene so as to form a copolymer or may be formed solely from styrene. Preferred examples of acid free monomers include butyl acrylate, methyl methacrylate, ethyl methacrylate, butyl methacrylate, hydroxyethyl acrylate, hydroxyethyl methacrylate, acrylamide, methacrylamide, N-tertiarybutylacrylamide and styrene as a copolymerization agent. Acid containing monomers are less desirable but may equally be used. Such acid containing monomers may be selected from any carboxylic acid monomer preferably acrylic acid and methacrylic acid.

Although any acetate may be used for the binder, in one embodiment, a metal acetate is preferred over a non-metal acetate. Examples of metal acetates include nickel acetate, aluminum acetate and titanium acetate. Ammonium acetate is a less desirable but acceptable non-metal acetate. In one embodiment, the elevated drying temperatures used in the spray drying operation causes the acetate to partially or entirely decompose to a hydroxide film on the surface of the BN agglomerated particles.

In another embodiment, the binder comprises an inorganic material such as a metal salt or metal alkoxide which is soluble in water, e.g., aluminum alkoxide, titanium alkoxide, etc.

In one embodiment and depending on the type of binder used, the amount of binder in the slurry ranges from about 0.1 to 10 wt. %. In a second embodiment, in an amount of about 0.5 wt. % to 7 wt. %. In a third embodiment, from 1 to 5 wt. %.

In one embodiment, the concentration of binder and/or decomposition layer formed on the agglomerated BN particles following spray drying should remain essentially at the same molar ratio as the corresponding weight ratio of binder to boron nitride in the slurry. In a second embodiment, for a concentration of at least 1.8 wt. % of binder in the slurry, the molar ratio of binder to boron nitride is in a range of 0.00170-0.008. In a third embodiment wherein metal acetate binders are used, the molar ratio of binder to boron nitride is in a range of 0.00170-0.008.

Aqueous/Non-Aqueous Medium: In one embodiment, a base is used as the medium of the slurry. The base can be selected from any suitable alkaline which will enable the pH of the slurry to be controllably maintained above a pH of 7, and in one embodiment, above 7.3. Examples of base material include a hydroxide such as ammonium hydroxide, an alkali metal hydroxide such as sodium hydroxide or potassium hydroxide, or a methyl or ethyl ammonium hydroxide.

In another embodiment, the medium material comprises a material selected from at least one of isopropyl alcohol, methanol, and ethanol.

Optional Additives: In yet another embodiment, additives known to the art may be added to-the slurry. Examples include typical dispersants such as polycarboxylic acids, organometallic compounds, polyoxythylene-based nonionic surfactants, and the like.

In one embodiment, a polymerization initiator such as ammonium, sodium or potassium persulfate or other peroxide compound, or other known polymerization initiator can be included in the slurry to help complete polymerization of the binder.

Method for Making the Spherical BN Agglomerates: In one embodiment of the method of the invention, the binder and medium materials are first mixed together. BN powder and optional additives are then slowly added to the solution forming a slurry. To ensure good mixing, the slurry may be optionally processed via a high shear mill or blender for a viscous slurry with good shear thinning. In one embodiment, some additives such as sintering may be subsequently added to the solution in the slurry form and instead with the starting BN powder, helping to create a homogeneous blend of BN and sinter aid.

In one embodiment, the amount of BN and binder materials are adjusted such that the slurry has a viscosity of less than about 5000 cps at room temperature. In another embodiment, the slurry has a viscosity of less than about 3000 cps. In a third embodiment, the slurry has a viscosity of less than about 2000 cps. In a third embodiment, a viscosity of less than about 1000 cps.

In the next stage of the embodiment, the BN slurry is then spray dried in order to produce the spherical BN agglomerates of the invention. Techniques for spray drying are known in the art and are described in, for example, James S. Reed, Introduction to the Principles of Ceramic Processing, John Wiley & Sons, Inc. (1988), which is hereby incorporated by reference in its entirety. The use of larger dryers in the spraying process would allow more flexibility in particle size distribution and higher production rates. Furthermore, adjustment of the physical parameters of the spray drying operation allows flexibility in controlling the particle size of the BN agglomerates formed.

In one embodiment with a slurry contains significant amounts of water, and in order to evaporate all this water in the available residence time, the inlet and outlet temperatures and inlet and outlet temperatures as well as the slurry feeds may be appropriately controlled to slow down the feed to the atomizer to allow appropriate drying time and desired spherical powder sizes.

In one embodiment as typically done with BN powder made in the prior art, the BN product is further sintered at a temperature of at least about 1600° C. for about 1 to 12 hours to improve the thermal diffusivity, impurity, and crystal structure of the BN. In one embodiment, the sintering is at least 1800° C. In a second embodiment, the sintering is at above 2000° C. In a third embodiment, the sintering is from about 2 to about 3 hours at least 1800° C. In a fourth embodiment, the sintering is in the range of 1800° C. to 2400° C., and in a fifth embodiment, from 2000° C. to 2200° C. Suitable atmospheres for sintering include inert gas, nitrogen, and argon. In one embodiment, the sintering is carried out in a vacuum. In yet another embodiment, the sintering is carried out under conditions of at least 1 atmosphere of pressure.

In yet another embodiment, the spherical BN agglomerates are further surface treated to modify the coating material on the agglomerates. In one embodiment, the spherical BN agglomerates are treated in a fluid bed coater, wherein the agglomerates upon contact with a flow of $AlC_3$ vapors and air combination, will have the surface functionalized or coated with at least a layer of aluminum oxide to further enhance the property.

In yet another embodiment, the spherical BN agglomerates are further reduced to a desirable size range by using any combination of jaw crushing, roll crushing and/or fine milling processes. Coarse agglomerates that are greater than the target particle size may be re-crushed and classified until they are within the target size distribution. In one embodiment, spherical BN/aluminum oxide agglomerates may undergo cold pressing or isostatic pressing to form a new log, briquette, or pellet with desirable crystalline properties. Following pressing, the new log, briquette, or pellet is crushed again. The pressing and crushing steps may be repeated any number of times to modify the crystal size, particle size, particle size distribution of the resulting spherical BN feedstock powder for use in the thermally conductive composition.

In one embodiment, the spherical boron nitride powder is classified under conditions effective to obtain a desired agglomerate size distribution. As used herein, an agglomerate size distribution is the range of agglomerates from the smallest agglomerate present to the largest agglomerate present, as defined by characteristic diameter of the agglomerates, wherein the agglomerates span the range. Suitable methods for classification include screening, air classifying, and elutriation, (see Chem. Eng. Handbook, Perry & Chilton, 5.sup.th Ed., McGraw-Hill (1973), which is hereby incorporated by reference in its entirety). As such classification methods are well known in the art, they will only be discussed briefly herein.

Screening is the separation of a mixture of various sized solid particles/agglomerates into two or more portions by means of a screening surface. The screening surface has openings through which the smaller particles/agglomerates will flow, while the larger particles/agglomerates remain on top. This process can be repeated for both the coarse and small particle/agglomerate size streams, as many times as necessary, through varying screen openings to obtain a classification of particles/agglomerates into a desired particle/agglomerate size range. Air classifiers rely upon air drag and particle inertia, which depends upon particle/agglomerate size, to facilitate the separation of fine particles/agglomerates from coarse particles/agglomerates.

Making Coated Spherical BN Agglomerates: Applicants have found that in certain embodiments of the invention and with certain selected binder materials, the spherical BN agglomerates upon heat treatment at a sufficient temperature for a sufficient amount of time, decomposes or further reacts to form at least a residue material or coating on the surface of the spherical BN agglomerates.

In one embodiment, the heat treatment is at a sufficient temperature for a sufficient amount of time for the spherical BN agglomerates to be "surface functionalized," for the binder to be modified chemically, forming a coating layer on the agglomerates.

The heat treatment can be carried in the same sintering step as described above to improve the crystal structure of the BN. The heat-treatment condition varies according to the binder used and the desired amount of coatings on the spherical BN agglomerates. In one embodiment, the heat treatment is at a temperature of at least 1200° C. for at least ½ hr. In a second embodiment, the heat treatment at >1500° C. for at least 1 hour. In a third embodiment, the heat treatment is at 1800° C., and carried out in the sintering step to further the crystal growth of the BN powder.

Depending on the binder used, the amount of binder in the slurry, the temperature and duration of the heat treatment, the amount of decomposed materials/coating layer on the BN agglomerates varies from about 0.5 to about 10 wt. % of the total weight of the BN agglomerates. In one embodiment after heat treatment, the amount of oxide coating on the BN agglomerates ranges from 1 to 7 wt. %. In another embodiment, from 2 to 5 wt. %.

In one embodiment wherein aluminum sulfate, aluminum propoxide, aluminum silicate, sodium aluminate, or aluminum acetate, and the like, is used as the binder in the slurry to form spray-dried spherical BN agglomerates, the binder decomposes in the heat-treatment process to form alpha aluminum oxide coating the spherical boron nitride agglomerates. The alumina coated spherical BN powder shows significantly improved thermal conductivity property compared to spherical BN powder not having an alumina coating.

Products from the Present Invention: In one embodiment, the spherical agglomerates of boron nitride platelets have an average agglomerate size or diameter of from about 1 microns to about 500 microns. In another embodiment, the majority of boron nitride agglomerates have an average diameter of from about 3 microns to about 150 microns.

In one embodiment, the spherical BN agglomerates have a powder tap density ranges from about 0.3 g/cc to about 0.8 g/cc. In a second embodiment, the power tap density ranges from about 0.4 g/cc to about 0.7 g/cc. In a third embodiment, from 0.45 g/cc to 0.7 g/cc.

As agglomerate size distribution (ASD) of BN is typically determined by the intended use of the spherical boron nitride powder in the final application. For example, for compliant interface pads, where the polymer is a low durometer silicone rubber, the desired ASD is such that the coarsest agglomerate diameter is smaller than the thickness of the interface pad. For situations in which flexibility of a polymer including the spherical boron nitride is important, large agglomerates, e.g., above 150 μm, are reduced in concentration or removed entirely, as the use of smaller agglomerates improves flexibility of the resulting polymer blend. In addition, a plurality of agglomerate size ranges may be combined in the spherical boron nitride powder to achieve the desired flexibility and thermal conductivity, as smaller agglomerates will fit within the interstitial spaces of the larger agglomerates.

The diameter of each spherically shaped BN particles formed by the spray drying method of the present invention may vary in size over a relatively wide size distribution of sizes, but may be controlled so that the majority of particles and up to about 98% of the BN particles have a minimum diameter of >1 μm, preferably a minimum diameter >5 μm, and with a maximum diameter of about 275 μm. In one embodiment, the spherical agglomerates of boron nitride have an ASD of about 5 to 125 μm. In a second embodiment, from 74 to 125 μm. In a third embodiment, 74 to 105 μm. In a fourth embodiment, 20 to 74 μm. In a fifth embodiment, 38 to 74 μm. In a sixth embodiment, a narrow size range of 10 to 38 μm. In a seventh embodiment, 20 to 38 μm.

The spherical boron nitride powder of the present invention can be used as a filler for thermal management applications, e.g., in composites, polymers, and fluids; in cosmetic applications; thermal spray coating applications; electroplating and electroless-plating applications, etc. The spherical boron nitride powder can also be used in hot pressing, due to the improved packing density and uniform fill characteristics of the powder. Moreover, the resulting spherical boron nitride powder can be used as precursor feed stock material in the conversion of hexagonal boron nitride to cubic boron nitride. In the conversion of high purity hexagonal boron nitride to cubic boron nitride, the compacted form of boron nitride is subjected to extremely high pressures and temperatures within the stable region of the cubic boron nitride phase diagram. The density of the boron nitride pellets is significant to the economics of the cubic boron nitride conversion process.

In one embodiment, the invention further relates to a system comprising spherical BN agglomerates, e.g., a heat source, a heat sink, and a thermally conductive material connecting the heat source to the heat sink, wherein the thermally conductive material includes a powder phase including spherical agglomerates of hexagonal boron nitride platelets. As used herein, a heat sink is a body of matter, gaseous, liquid, or solid, that receives a heat transfer from its surrounding environment. Suitable heat sources for the present invention include integrated circuit chips, power modules, transformers, and other electronic devices. Suitable heat sinks in accordance with the present invention include finned aluminum, copper, berilium, and diamond.

As used herein, a thermally conductive material may be a composite, polymer, or fluid. In one embodiment, the thermally conductive material is a polymer, such as a melt-processable polymer, a polyester, a phenolic, a silicone polymer (e.g., silicone rubbers), an acrylic, a wax, a thermoplastic polymer, a low molecular weight fluid, or an epoxy molding compound.

In one embodiment wherein the spherical BN agglomerates are used in thermal management applications, the thermally conductive polymer blend comprises from about 30 wt. % to about 80 wt. % spherical boron nitride powder. However, the loading of the spherical boron nitride powder into the polymer blend is determined by the desired flexibility and thermal conductivity of the resulting blend. For example, lower loading of the spherical hBN powder, such as 30 wt. % to 50 wt. %, is desirable for high flexibility applications, but results in lower thermal conductivity. Thus, loading at from about 50 wt. % to about 80 wt. % is desirable in high thermal conductivity/low flexibility applications.

Prior to the present invention, BN powder for loading into polymers has been produced by a pressing process, producing hBN powder including non-spherical agglomerates of aligned hBN platelets. However, in the spherical BN agglomerates, the distribution of hBN platelets is random (as compared to aligned flakes in pressed agglomerates). Thus, spherical BN filled polymer film in accordance with the present invention should show more isotropic thermal conductivity and higher thermal conductivity through the thickness of the polymer.

The thermal conductivity of the resulting polymer blend is determined by loading, dispersion, and other factors. In one embodiment, the polymer blend has a thermal conductivity of from about 1 W/mK to about 15 W/mK. In a second embodiment, the blend has a thermal conductivity of 5 to 10 W/mK In a third embodiment, the blend has a thermal conductivity of 10 to 30 W/mK In a fourth embodiment, the blend has a thermal conductivity of 20 to 40 W/mK Because of the spherical shape of the hBN agglomerates in the polymer blends of the present invention, inter-agglomerate friction is reduced, thus allowing higher solids loading and, accordingly, higher thermal conductivity. In addition, spherical shaped hBN agglomerates have the lower surface areas, which reduces the amount of adsorbed polymer on the agglomerate surfaces, thus freeing up more polymer to improve flowability/reduce viscosity.

FIG. 1 is a schematic block diagram of the spray drying apparatus used in one embodiment of the method of the present invention to form a powder composition of BN composite particles each of generally spherical shape. The spray drying apparatus 10 may consist of conventional equipment including an atomizer 2 and a source of air or an inert gas 3, such as nitrogen, which forms an atomized spray of particles from an aqueous feed slurry 6 of water, a polymeric binder in the liquid phase and a base selected to maintain the pH of the slurry above a pH of 7.3 and preferably above a pH of 7.5. The atomized particle spray is preheated to a temperature in a range of 250° C.-360° C. preferably by preheating the nitrogen or air before injection at a desired feed rate into a spray drying chamber 1 with the outlet temperature between 110° C.-250° C. The BN particles in the feed slurry 6 preferably have a hexagonal crystalline structure although they may have a turbostratic structure. A dispersant, cross-linking agent and defoamer may also be included in the aqueous feed slurry 6 but are not essential. In one embodiment, a polymerization initiator such as ammonium, sodium or potassium persulfate or other peroxide compound or other known polymerization initiator can be included to complete polymerization of the binder.

Figure 3:
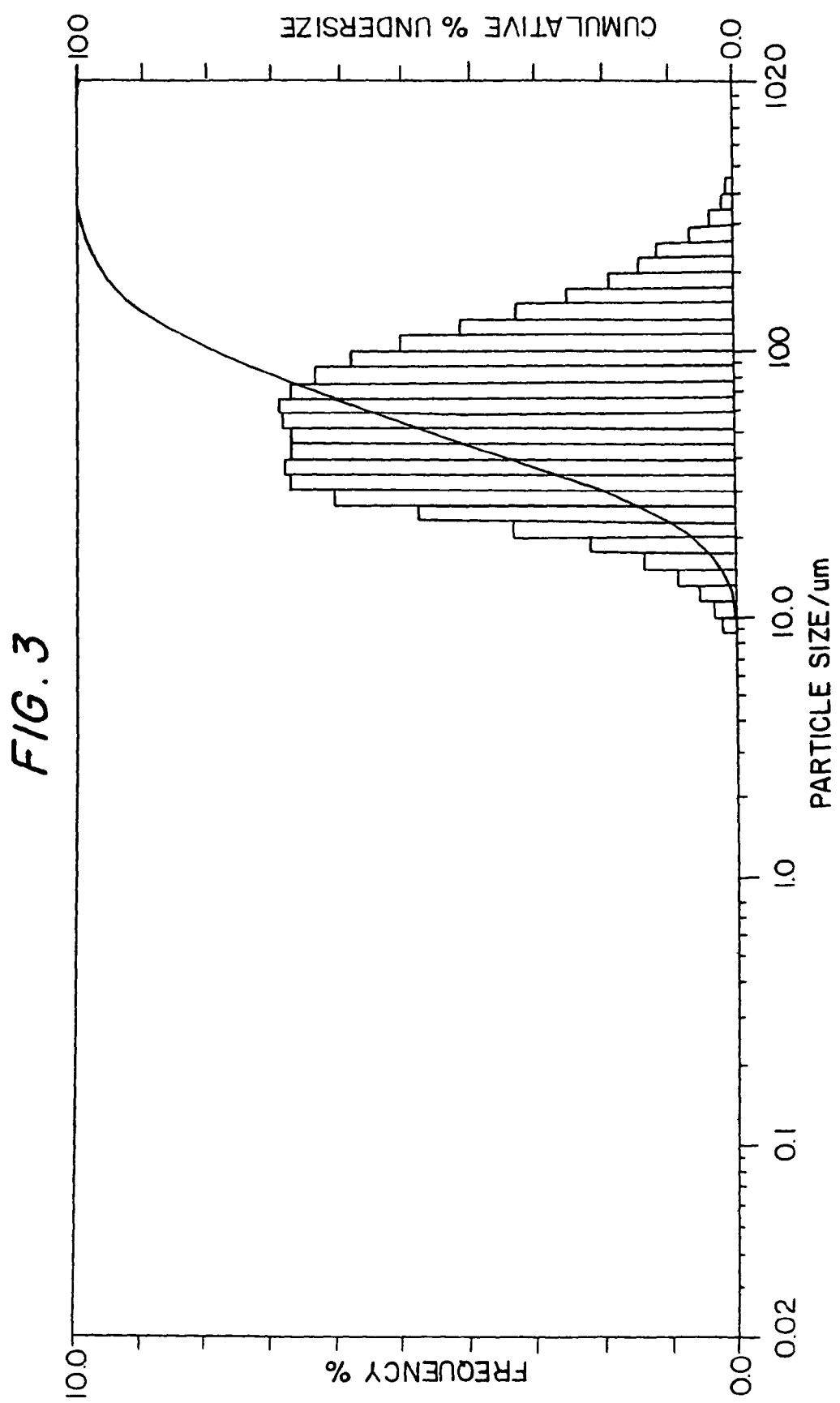
FIG. 3 is a typical graph of the particle size distribution of the collected BN particles from the spray drying operation of the present invention.

In one embodiment, the particles formed in the spray drying chamber 1 are dried at an elevated temperature to a moisture level typically below 1% and collected. A cyclone 8 may be incorporated to remove superfine size particles before collection. The collected particles are solid particles having the same structure as the initial BN particles in the slurry 1. In one embodiment, the solid particles vary in diameter over a distribution range as shown in FIG. 3 from a minimum diameter size of one about micron up to about 275 microns, with a mean particle size which varies based upon the size of the non-spherical BN particles, the concentration of binder, and the selected spray drying parameters of operation such as slurry ratio, feed rate, gas pressure etc. The mean particle size for the distribution of particles in FIG. 3 is about 55 microns but can be controllably adjusted.

Figure 2:
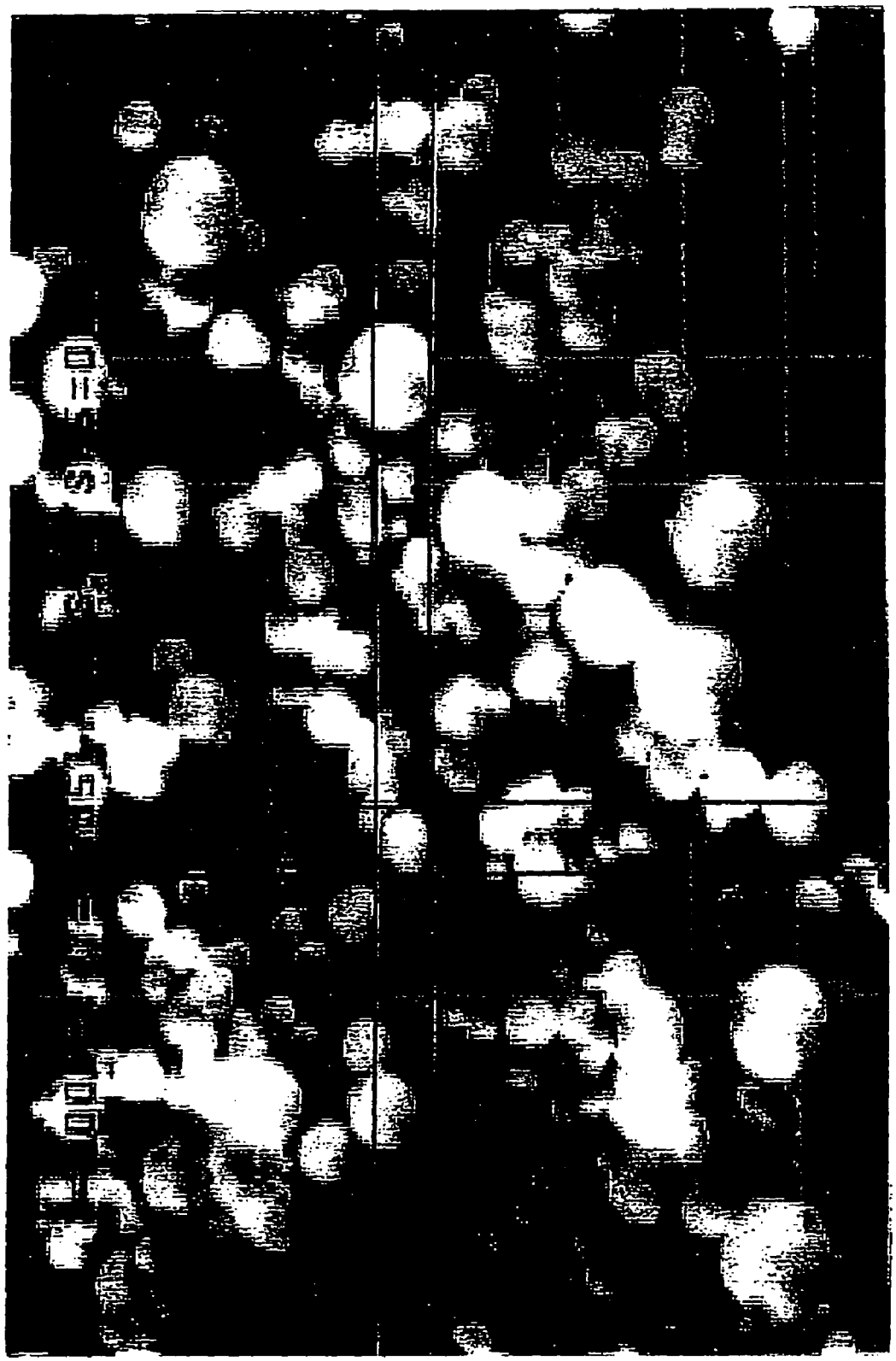
FIG. 2 is a photomicrograph of the spherically shaped BN particles formed by the spray drying operation of the present invention at a magnification of 50×.

In accordance with one embodiment of the present invention, the powder BN product collected from the spray drying operation possesses particles which are essentially all of generally spherical geometry as evident from the photomicrograph of FIGS. 2 and 3. Each of the collected particles is a solid agglomerated particle formed of irregular non-sperical BN particles bound together by the organic binder in a spherical geometry. The high concentration of the organic binder in the slurry forms a coating over each of the recovered particles which at a concentration of over about 1.8 wt. % of the slurry varies the surface characteristic of the spray dried BN particles such that when added as a filler to a polymer selected from a polyester, epoxy or polyimide even under high loading levels at concentrations of between 30-50 wt. % BN, the flow characteristic of the filled polymer is not inhibited. In one embodiment, the viscosity of the filler polymer can be tailored to below about 250 cp. provided the concentration of organic binder is above about 2 wt. % of the slurry. At a viscosity below about 250 cp, the filler polymer is easily dispensed through any conventional mechanical dispenser.

EXAMPLES

Examples are provided herein to illustrate the invention but are not intended to limit the scope of the invention.

Examples 1-4

The following are examples of four ceramic slurries spray dried in accordance with one embodiment of the present invention to substantiate the production of spherical BN particles from a feed slurry of non-spherical irregular shaped BN particles from GE Advanced Ceramics of Strongsville, Ohio.

The four slurries consisted of conventional non-spherical BN powder in water with feed solids ranging from 32% to 49%. The pH of each slurry sample varied between 7.75 and 8.5. The pH was controlled by the addition of an ammonium hydroxide buffer at a concentration of less than 0.5 wt %. The binder selected for each example was "Efka" 4550 in a concentration of between about 1 to 5 wt %. "Efka" is a registered trademark of the Lubrizol Corporation and is a polyacrylate. A resin dispersant Efka 1501 which is a polyester fatty acid from Lubrizol at a concentration of about 0.25-2.00% was also added. Alternate binders which were found to be just as effective include "DURAMAX" 1022, "DURAMAX" 1020 and "DURAMAX" 3007. "DURAMAX" is a registered trademark of the Rohm and Haas Company in Philadelphia Pa. "DURAMAX" 1020 and "DURAMAX" 1022 are styrene/acrylic copolymers formed from acrylic monomers. It was not necessary to add any resin dispersant. However in this example, a buffer such as ammonium hydroxide used to adjust the pH of the non-spherical BN particle aqueous slurry to above 7.3 was essential.

The following four tables contain all of the process conditions of the spray drying operation:

TABLE 1

| | Run | | | |
|---|---|---|---|---|
| | 1 | 2 | 3 | 4 |
| Feed Material | BN Slurry in water | | | |
| Percent EFKA binder | 0.25-40 | | | |
| Solid % | 32.7-49.0 | | | |
| Temperature ° C. | 19 | 23 | 19 | 19 |
| Density, g/cm3 | 1.292 | 1.195 | 1.194 | 0.963 |
| PH | 7.75 | 8.44 | 8.38 | 7.77 |
| Viscosity, Ave. cp | 104 | 706 | 806 | 3006 |

TABLE 2

BN test data properties

| | Run #1 | Run #2 | |
|---|---|---|---|
| Sample location | Chamber | Chamber | Cyclone |
| Sample time | 10:40 | 11:10 | 12:15 |
| Sample weight, g | 195.8 | 210.3 | 199.5 |
| Total weight, kg | 0.59 | 7.17 | 9.48 |
| Total residual moisture, %$_2$ | 0.30 | 0.50 | 0.35 |
| Bulk density, g/cc | 0.551 | 0.562 | 0.521 |
| Tapped density, g/cc | 0.621 | 0.631 | 0.611 |
| Particle size, microns, | | | |
| 10% less than | 27.02 | 30.09 | 11.00 |
| 50% less than (median size) | 94.07 | 112.13 | 23.31 |
| 90% less than | 189.84 | 180.28 | 87.87 |
| Chamber-to-cyclone ratio (kg/kg) | 0.82 | | |

TABLE 3

BN test data properties - product 2B

| | Chamber | Cyclone |
|---|---|---|
| Sample location | | |
| Sample weight, g | 132.6 | 74.9 |
| Total weight, kg | 5.26 | 5.33 |
| Total residual moisture, % | 0.45 | 0.79 |
| Bulk density, g/cc | | |
| Particle size, microns | | |
| 10% less than | 23.49 | 15.09 |
| 50% less than (median size) | 55.03 | 25.42 |
| 90% less than | 142.60 | 43.90 |
| Chamber-to-cyclone ration (Kg/Kg) | 2.15 | 0.99 |

TABLE 3

BN test data properties

| Sample location | Chamber | Cyclone | Chamber | Cyclone |
|---|---|---|---|---|
| Sample weight, g | 141.6 | 85.2 | 110.5 | NA |
| Total weight, kg | 3.04 | 6.24 | 1.13 | 1.50 |
| Total residual moisture, % | 0.59 | 0.43 | 0.41 | 0.39 |
| Bulk density, g/cc | 0.331 | 0-.221 | 0.305 | 0.273 |
| Tapped density, g/cc | 0.09 | 0.287 | 0.382 | 0.342 |
| Particle size, microns | | | | |
| 10% less than | 10.83 | 8.46 | 7.22 | 6.91 |
| 50% less than (median size) | 25.85 | 14.59 | 14.69 | 12.87 |
| 90% less than | 102.38 | 21.66 | 25.89 | 20.37 |
| Chamber-to-cyclone ratio (kg/kg) | 0.49 | 0.75 | | |

Example 5

The following is another example for forming spray dried boron nitride particles in accordance with another embodiment of the present invention. In this example aluminum acetate is used as the organic binder and bismaliamide is used as the polymer.

A boron nitride powder PT 120 (Lot 5151) was used to demonstrate the effect of surface modification on the viscosity of the BN filled resin. A conventional thermosetting resin, bismaliamide (BMI), from Quantumn Chemical was used as the polymer into which non-spherical BN particles were loaded. PT 120 is a conventional boron nitride powder with a platelet morphology, commercially available from GE Advanced Ceramics. The physical and chemical characteristics are shown in the following Tables 5A-5C.

The PT120 filled resin was spray dried using a laboratory scale spray dryer, Mobile Minor Hi Tec, made by Niro Atomizer. A slimy was prepared by mixing boron nitride in de-ionized water using a high intensity mixer. Aluminum acetate-dibasic was added to the slurry and the slurry was mixed. After stabilizing the slurry, spray dying was initiated. The slurry composition for three separate runs is described in Table 5A.

TABLE 5A

| | Run No. | | |
|---|---|---|---|
| | SD7 | SD8 | SD9 |
| Water (gm) | 3000 | 3500 | 3000 |
| Boron Nitride (gm) | 1050 | 1225 | 1050 |
| Aluminum Acetate-Dibasic (gm) | 52 | 91.88 | 26.25 |
| BN/Water (wt. %) | 35 | 35 | 35 |
| Al. Acet./BN (wt. %) | 5 | 7.5 | 2.5 |

After the slurry was prepared, it was kept agitated by the mixer. The slurry was then pumped into the feed section of the spray dryer by using a peristaltic pump. The spray dryer was in the range of 110° C. to 150° C. Air flow was set in the range of 17 to 22 on the gauge. BN feed rate (powder basis) was 1016, 1050 and 841 gm/hr for SD7, SD8 and SD9 respectively. Powders were collected from chamber and cyclone and then tested for their rheological properties.

Rheological Testing: Powders were mixed with the BMI resin alone at 37.4 wt. % loading level to form a baseline. About 30 gm. of resin was used in each case. After careful mixing in a cup, it was placed in a vacuum chamber for removal of trapped air. After evacuating for a few hours, it was carefully mixed and then placed into evacuation chamber again. Once air bubbles stopped rising to the surface, the cup was removed. The resultant paste was gently stirred and placed in a water-cooled bath for equilibrating to 25° C. After it reached a constant temperature of 25° C., viscosity was measured by Brookfield rheometer DVII using spindle no. 96. Viscosity was measured at various speeds but the measurements taken at 5 rpm ware used for comparison, Measurements were taken after at least 5 minutes from the start of the rotation to obtain steady state value.

The results of viscosity tests and analytical data are given in Table 5B and 5C for powders collected from chamber and cyclone respectively.

TABLE 5B

| | PT120-baseline | SD7 - Chamber | SD8 - Chamber | SD9 - Chamber |
|---|---|---|---|---|
| Baseline | | | | |
| % Oxygen | 0.371 | 5.17 | 5.71 | |
| % Carbon | 0.021 | 0.58 | 0.84 | |
| Surface Area | 2.97 | 4.5 | 7.91 | 8.68 |
| MicroTrac Size | | | | |
| D-10 (Microns) | 6.15 | | | |
| D-50 (Microns | 12.32 | | | |
| D-90 (Microns | 21.71 | | | |
| Shape | Plate | Spheroidal | Spheroidal | Spheroidal |
| Agglomerate Size Microns | 70-150 | 70-150 | 70-150 | |
| Viscosity cp, @5 RPM | 400,000 | 141,000 | 74,000 | 242,000 |
| Comments | No aluminum acetate, no sphericalization | Increased surface area due to coating | Increased surface area due to coating | Increased surface area due to coating |

TABLE 5C

| | Run | | | |
|---|---|---|---|---|
| | PT120-baseline | SD7 - chamber | SD8 - chamber | SD9 - chamber |
| Agglomerate Size - μm | 10-50 | 10-50 | 10-50 | 10-50 |
| Viscosity cp @ 5 RPM | 400,000 | 400,000 | 258,000 | 216,000 |

Example 6

In these examples, slurries of conventional non-spherical BN powder in water with feed solids ranging from 19-50 wt.

% were prepared. In some examples, polyvinyl alcohol (PVA) commercially available as Celvol 21-205 from Celanese and aluminum acetate from Chattem Chemicals, Inc. were used as binders. In some examples, the spherical BN agglomerates were heat-treated at 1900° C. or 1950° C.

For viscosity measurements, the powder was mixed with silicone fluid (Dow Corning 200 fluid-100 CST) using a FlackTek speed mixer for about 20 seconds at approximately 3500 rpm. The viscosity, in poise, was measured using Advanced Rheometer 2000 (TA Instruments). For thermal conductivity measurements, 60 wt. % (40 vol %) of powder was mixed with 35 wt. % Sylgard 184 Silicone Resin and 3.5 wt. % curing agent Sylgard 184 in a FlackTek speed mixer at approximately 3500 rpm. The mixture is placed in a 3"×6" rectangular mold and pressed at 125° C. for 45 minutes to form pads of 0.5 to 1.5 mm in thickness. The bulk thermal conductivity in W/mK was measured via a Hot Disk® Thermal Constants Analyzer. The % Breakdown is a measure of change of the average particle size (D50) using a Microtrac® Analyzer. The D50 is measured without sonication and compared with the D50 measured after 1 minute of sonication. The difference between the two D50 indicates the % breakdown of the particle.

Table 6A shows the properties of two different boron nitride powders used in the slurry, including surface area (SA), oxygen and carbon content, soluble borates content, and particle size distribution wherein D50 accounts for the average particle size, D10 and D90 refer to the 10$^{th}$ and 90$^{th}$ percentile of particle size distribution, respectively.

TABLE 6A

BN Feed Properties

| Properties of BN used in slurry: | BN 1 | BN 2 |
|---|---|---|
| Oxygen (%) | 1.8 | 0.4 |
| Carbon (%) | 0.02 | 0.04 |
| SA (m2/g) | 30 | 8 |
| Sol. Borate (%) | 0.2 | 0.04 |
| D10 (microns) | 0.7 | 7 |
| D50 (microns) | 4.5 | 14 |
| D90 (microns) | 12 | 15 |
| Tap Density (g/cm3) | 0.3 | 0.2 |

The slurry was prepared by first mixing polyvinyl alcohol (PVA) or aluminum acetate in a de-ionized water using a high intensity mixer. A mixture of 80% of the BN1 powder and 20% of the BN2 powder was then added to the slurry, and the slurry was further mixed. After stabilizing the slurry, spray drying was initiated. After the slurry was prepared, it was kept agitated by the mixer. The slurry was then pumped into the feed section of the spray dry by using a peristaltic pump. The spray dryer was operated with its fan on, inlet temperature of 285° C. The outlet temperature was around 110° C.

Table 6B indicates the slurry properties to be used in the spray drying Examples 1-4

TABLE 6B

| BN Slurry Feed Properties | Example 1 | Example 2 | Example 3 | Example 4 |
|---|---|---|---|---|
| BN (wt. %) | 19% | 19% | 15.2% | 15.2% |
| PVA binder (wt. %) | 2% | 2% | — | — |
| Aluminum Acetate (wt. %) | — | — | 1.7% | 1.7% |
| Water (wt. %) | 79% | 79% | 83.3% | 83.3% |

Example 1 was prepared by spray drying a mixture of dispersed boron nitride (BN) in water, resulting in spherical BN agglomerates. Properties of the spherical BN agglomerates of Example 1 were measured and shown in Table 6C.

In Example 2, the spherical BN agglomerates of Example 1 were heat-treated at 1950° C. for 20 hours. The sample was then crushed and screened with a 100-mesh size screen. Properties of the heat treated spherical BN agglomerates were measured and shown in Table 6C as Example 2.

Example 3 was prepared by spray drying a mixture of aluminum acetate and boron nitride dispersed in water, which resulted in spherical BN/Alumina composites. Properties of the spherical BN agglomerates of Example 3 after spray drying were measured and recorded in Table 6C.

In Example 4, the spherical BN agglomerates of Example 3 were heat-treated at 1950° C. for 20 hours. After heat-treatment, the sample was crushed and screened with a 100-mesh size. Properties of the heat treated spherical BN agglomerates were measured and shown in Table 6C as Example 4.

TABLE 6C

|  | Example 1 No heat-treat | Example 2 Heat-treated | Example 3 No heat-treat | Example 4 Heat-treated |
|---|---|---|---|---|
| % Aluminum acetate | 0 | 0 | 10% | 0 |
| % Aluminum Oxide | 0 | 0 | 0 | 3.54% |
| Oxygen (%) | 2.6894 | 0.135 | 5.73915 | 1.475 |
| Carbon (%) | 1.043 | 0.032 | 1.238 | 0.048 |
| SA (m2/g) | 26.18 | 3.23 | 52.22 | 3.71 |
| Sol. Borate (%) | — | 0.02 | — | 0.04 |
| D10 (microns) | 7.52 | 13.88 | 5.871 | 30.7 |
| D50 (microns) | 21.82 | 60.12 | 17.5 | 64.55 |
| D90 (microns) | 66.12 | 91.69 | 39.69 | 83.31 |
| % Breakdown | 62.18 | 37.46 | 19.48 | 11.81 |
| Tap Density (g/cm3) | 0.50 | 0.34 | 0.63 | 0.36 |
| Viscosity (38 wt. %) @ shear rate 1/s (poise) | 706 | 1519 | 36.9 | 844 |
| Thermal Conductivity with 40% vol. (W/mK) | 2.93 | 13.097 | 2.36 | 9.767 |

As illustrated in Table 6C above, samples with aluminum acetate as a binder (Examples 3-4) show a much lower breakdown than samples without aluminum acetate as a binder (Examples 1-2). Furthermore, samples that are not heat-treated have a much lower thermal conductivity than heat-treated samples, even though the viscosity is lower for samples that are not heat-treated. In comparing two samples that are not heat treated (Examples 1 and 3), it is noted that the sample with aluminum acetate as a binder demonstrates a much lower viscosity property, although showing a similar thermal conductivity property. After heat-treatment, the spherical BN agglomerates with aluminum acetate as a binder (Example 4) still show a lower viscosity value than the heat-treated BN agglomerates without aluminum acetate as a binder (Example 2).

The results of the examples show the benefit of heat-treatment, in that it facilitates crystal growth and crystallization of the amorphous phases, thus increasing the thermal conductivity. Also as shown, after heat treatment, the aluminum acetate binder decomposes, forming an aluminum oxide coating on the spherical BN agglomerate powder.

Example 7

In these examples, slurries of conventional non-spherical BN powder in water with feed solids of 31 wt. % were prepared. The properties of the non-spherical BN feed used in the Examples are shown in Table 7A:

TABLE 7A

| Properties of BN used in slurry: | Example 5 | Example 6 |
|---|---|---|
| Oxygen (%) | 1.98 | 0.371 |
| Carbon (%) | 0.03 | 0.021 |
| SA (m2/g) | 27.7 | 2.97 |
| Sol. Borate (%) | 0.17 | 0.01 |
| D10 (microns) | 1.05 | 6.15 |
| D50 (microns) | 6.7 | 12.32 |
| D90 (microns) | 12.2 | 21.71 |
| Tap Density (g/cm3) | 0.39 | 0.48 |

In the examples, polyvinyl alcohol (PVA) commercially available as Celvol 21-205 from Celanese and aluminum acetate from Chattem Chemicals, Inc. were used as binders. The slurry was prepared by dispersing aluminum acetate in a de-ionized water using a high intensity mixer. Boron nitride was added to the slurry and the slurry was mixed. Properties of the BN slurry feed in the Examples are shown in Table 7B:

TABLE 7B

| BN Slurry Feed Properties | Example 5 | Example 6 |
|---|---|---|
| BN (wt. %) | 31% | 31% |
| Aluminum Acetate (wt. %) | 2% | 2% |
| Water (wt. %) | 67% | 67% |

After stabilizing the slurry, spray drying was initiated. After the slurry was prepared, it was kept agitated by the mixer. The slurry was then pumped into the feed section of the spray dry by using a peristaltic pump. The spray dryer was operated with its fan on, inlet temperature of 285° C. The outlet temperature was around 110° C. After spray drying, some of the spherical agglomerates were cold pressed into 1.125" diameter disks. A force of 10,000 lbs was applied to each disk, which weighted 10 grams. The disks as well as the powders were heat-treated at high temperature of 1900° C. for 20 hrs. The final powder and Is the disks consisted of spherical BN/Alumina composite. The powder was crushed and screened to less than 100 microns in size.

The thermal conductivity of a disk containing 100% powder was measured using a Hot Disk® Thermal Constants Analyzer. The thermal conductivity of the powder was also obtained by first preparing silicone pads via mixing 60 vol % of BN powder, 35 wt. % Sylgard 184 Silicone Resin and 3.5 wt. % curing agent Sylgard 184 in a FlackTek speed mixer at approximately 3500 rpm. The homogeneous mixture was placed in a 3"×6" rectangular mold and pressed at 125° C. for 45 minutes to form pads of 0.5 to 1.5 mm in thickness. The bulk thermal conductivity in W/mK was measured via a Hot Disk® Thermal Constants Analyzer. Additionally, a function was created to correlate the thermal conductivity of the pad with 60 vol % BN to the thermal conductivity of a disk made from same starting BN powder. The disk thermal conductivity is 1.88 times the thermal conductivity of the pad. Properties of the powder and disk samples of Examples 5 and 6 are illustrated in Table 7C:

TABLE 7C

| Properties of BN | Example 5 (powder) | Example 5 (disk) | Example 6 (powder) | Example 6 (disk) |
|---|---|---|---|---|
| Oxygen (%) | 0.3 | — | 0.27 | — |
| Carbon (%) | 0.04 | — | 0.05 | — |
| SA (m2/g) | 2.77 | — | 2.6 | — |
| Sol. Borate (%) | 0.01 | — | 0.01 | — |
| Tap Density (g/cm3) | 0.56 | — | 0.48 | — |
| Thermal Conductivity (W/mK) | 16.83 | 31.62 | 6.37 | 11.97 |

The high conductivity of example 5 in comparison to example 6 can be explained by the different starting BN powders used. Example 5 contains a starting BN powder with much higher oxygen content (1.98%) and surface area (27.7 m$^2$/g) than example 6 (0.371% and as 2.97 m2/g), thus giving a much higher thermal conductivity. Additionally, Example 5 has a mean particle size (D50) that is about 50% smaller than D50 for Example 6.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All citations referred herein are expressly incorporated herein by reference.

The invention claimed is:

1. A boron nitride powder comprising agglomerated particles of spherical geometry, wherein said spherical agglomerates particles have an average particle size of about 1 to 150 microns in diameter and a tap density of at least 0.289 g/cc, wherein the particles have a surface layer comprising organic binder and/or decomposition product thereof, and wherein the spherical agglomerates particles are prepared by spray drying an aqueous slurry of non-spherical shaped boron nitride particles in a binder selected from the group consisting of acrylics, acetates, and mixtures thereof.

2. The boron nitride powder of claim 1, wherein said decomposition product comprises at least one of a hydroxide and an oxide.

3. The boron nitride powder of claim 1, wherein the binder comprises aluminum acetate.

4. A composition comprising the boron nitride powder of claim 1 and a melt-processable polymer.

5. The composition of claim 4, wherein the composition at a loading level of boron nitride powder of about 30 to 50 wt. % has a viscosity of below 300 cp at 25° C.

6. The composition of claim 4 wherein the melt-processable polymer is a polyester, phenolic, silicone, acrylic, wax, or an epoxy molding compound.

7. A spherical boron nitride powder consisting essentially of spherical agglomerates of boron nitride platelets.

8. A polymer composition comprising: a polymer selected from the group consisting of melt-processable polymers, polyesters, phenolics, silicone polymers, acrylics, waxes, thermoplastic polymers, epoxy molding compounds, and blends thereof; between 30-50 wt. % of a powder comprising spherical boron nitride agglomerates formed by a process of spray drying an aqueous slurry comprising non-spherical shaped boron nitride particles, water, an organic binder and a base for maintaining the pH of the slurry basic and adjusting the concentration of said organic binder in the slurry such that the viscosity of the filler polymer composition is below 300 cp at 25° C.

9. The polymer composition of claim 8, wherein the binder is selected from the group consisting of an acrylic or an acetate.

10. The polymer composition of claim 8, wherein the binder is selected from the group consisting of nickel acetate, aluminum acetate and titanium acetate.

11. The polymer composition of claim 8, wherein the concentration of acetate binder in the slurry is above about 2.5 wt. %.

12. A method for making spherical boron nitride powder comprising:
providing a hexagonal boron nitride slurry including a binder;
spray drying the slurry under conditions of available residence time, inlet and outlet temperatures, slurry pH, and slurry feed rate effective to produce spherical boron nitride powder comprising spherical agglomerates of boron nitride platelets; and
sintering the spherical boron nitride powder.

13. The method of claim 12, further comprising surface treating the spherical boron nitride powder by at least one of heat treating and surface functionalization.

14. The method of claim 12, wherein the sintering is carried out at a temperature of from about 1800° C. to about 2400° C.

15. The method according to claim 12, wherein the hexagonal boron nitride slurry comprises from about 30 wt. % to about 50 wt. % hexagonal boron nitride powder.

16. The method according to claim 12, wherein the spherical agglomerates of boron nitride platelets have an average agglomerate diameter of from about 1 to about 500 microns.

17. The method according to claim 12, wherein the spherical agglomerates of boron nitride platelets have an average agglomerate diameter of from about 3 microns to about 150 microns.

18. The method according to claim 12, further comprising classifying the spherical boron nitride powder under conditions effective to obtain a desired agglomerate size distribution.

19. The method according to claim 18, wherein the classifying is selected from the group consisting of screening, milling, air classifying, and elutriation.

20. The method of claim 12 wherein the binder is a material which bonds the hexagonal boron nitride particles during spray drying and/or modifies the slurry viscosity.

21. The method of claim 12 wherein the binder is organic.

22. The method of claim 12 wherein the slurry comprises water.

23. The method of claim 12 wherein the slurry comprises a non-aqueous medium.

24. The method of claim 12 wherein pH of the slurry is above 7.0.

25. The method of claim 12 wherein the pH of the slurry is above 7.3.

26. The method of claim 12 wherein the slurry additionally comprises one or more of a polycarboxylic acid, an organometallic compound, a polyoxyethylene based non-ionic surfactant, a ammonium persulfate, potassium persulfate, sodium persulfate, or a peroxide.

27. The method of claim 12 wherein the binder comprises at least one of oxides, nitrates, acetates, sulfates of boron, aluminum, titanium, zirconium, silicon, nickel, rare earth and alkaline earth metallic elements, organic binders, decomposition products of organic binders, decomposition products of oxides, nitrates, acetates, and sulfates of boron, aluminum, rare earth and alkaline earth metallic elements, and mixtures thereof.

28. The method of claim 12 wherein the binder is selected from the group consisting of methyl acrylate, ethyl acrylate, butyl acrylate, methyl methacrylate, ethyl methacrylate, butyl methacrylate, isobutyl methacrylate, hydroxyethyl acrylate, hydroxypropyl acrylate, hydroxyethyl methacrylate, hydroxypropyl methacrylate, acrylamide, methacrylamide; N-tertiarybutylacrylamide, N-methacrylamide and N,N-dimethacrylamide, dimethylaminoethyl acrylate, dimethylaminoethyl methacrylate, acrylonitrile and methacrylonitrile.

29. A process for forming a boron nitride powder comprising agglomerated particles of spherical geometry having an average particle size of about 1 to 150 microns in diameter, said process comprising the steps of: mixing an aqueous slurry including irregular shaped boron nitride particles, water, an organic binder and a base for maintaining the pH of the slurry basic; spray drying the aqueous slurry into a powder composition of agglomerated boron nitride particles.

30. The process of claim 29, wherein the organic binder is selected from the group consisting of acrylics, acetates, and mixtures thereof.

31. The process of claim 30, wherein said organic binder is selected from the group consisting of nickel acetate, aluminum acetate and titanium acetate.

* * * * *